United States Patent [19]
Colasanti

[11] Patent Number: 4,732,409
[45] Date of Patent: Mar. 22, 1988

[54] DUAL MODE PASSENGER RESTRAINT SYSTEM

[75] Inventor: Arduino Colasanti, East Detroit, Mich.

[73] Assignee: American Safety Equipment Corporation, Troy, Mich.

[21] Appl. No.: 941,089

[22] Filed: Dec. 12, 1986

[51] Int. Cl.$^4$ ............... B65H 75/48; A62B 35/02
[52] U.S. Cl. ............... 280/808; 242/107.4 A; 280/801; 280/807; 297/476
[58] Field of Search ........ 280/801, 803, 808, 807; 297/477, 476; 242/107.4 A, 107.4 B

[56] References Cited

U.S. PATENT DOCUMENTS

| | | | |
|---|---|---|---|
| 3,771,814 | 6/1973 | Hahn | 280/803 |
| 3,890,003 | 6/1975 | Close | 297/477 |
| 4,225,156 | 9/1980 | Barnett | 280/808 |
| 4,552,319 | 11/1985 | Gavagan et al. | 242/107.4 A |
| 4,573,646 | 3/1986 | Willey | 242/107.4 A |
| 4,583,701 | 4/1986 | Matsui et al. | 242/107.4 A |
| 4,585,185 | 4/1986 | Ueda | 242/107.4 A |

Primary Examiner—Richard A. Bertsch
Attorney, Agent, or Firm—Poms, Smith, Lande & Rose

[57] ABSTRACT

A vehicle is equipped with a knee bolster for restraining an adult passenger's lower torso within a seat during emergency conditions, and a chest belt having one end wound onto an acceleration-sensitive retractor located at the lower, inward side of the seat and a second end releasably-secured to first quick-release means attached to a door or door frame of the vehicle adjacent to the seat for restraining the passenger's upper torso within the seat. A dual mode retractor having both an acceleration-sensitive mode and an automatic-locking mode is providing along with control means for engaging the automatic-locking mode. A second quick-release means is provided at the lower, outward side of the seat for alternative releasably receiving the chest belt lower end. The second quick-release means is provided with switch means for switching the replacement retractor to the automatic-locking mode when the second end of the belt is engaged therewith. This enables the system additionally to function in a second mode as an automatic-locking lap belt for restraining small children or infant seats.

10 Claims, 12 Drawing Figures

DUAL MODE PASSENGER RESTRAINT SYSTEM

BACKGROUND OF THE INVENTION

1. Field of the Invention

This invention pertains, in general, to vehicle emergency passenger restraint systems, and in particular, to a safety belt system capable of operating in either an acceleration-sensitive, chest-belt mode or an automatic-locking lap belt mode.

2. Description of the Related Art

Most vehicles and all automobiles in this country are, by law, equipped with some form of passenger restraint system for restraining the vehicle's passengers in their seats during emergency conditions, such as a collision.

These restraint systems may take the form of inflatable air bags, but typically comprise one or more safety belts which are secured at one end of the vehicle and pass across the lap or chest of the passenger to be secured at a second end, typically by quick-release means, to restrain the passenger within the seat against forward, lateral and upward movement during the emergency condition.

It is well known in the safety-belt art to provide retractor mechanisms which contain a spring-biased spool for winding one end of the belt thereon for extractive and retractive movement of the belt, primarily as a convenience feature. Where such retractor mechanisms are used, it is typical to provide the mechanism with some means for locking the belt against further extractive movement.

In an automatic-locking ("ALR") mode, the retractor is made to lock up against extractive movement upon the occurrence of an event exterior to the extractor, such as a sequential extraction and slight retraction of the belt, as would occur in the buckling-up procedure, or upon the shuttling of a door within the vehicle. In this mode, the belt encircles a portion of the anatomy of the wearer or a supplemental safety device, such as an infant seat or carrier, and serves to prevent movement of the passenger or seat within the vehicle such as would cause any further extractive movement of the belt, as long as the automatic-locking mode is engaged. This type of retractor operation is desirable in the case of restraining children and infant seats during normal operation of the vehicle wherein their unrestrained movement within the vehicle even during non-emergency conditions is undesirable.

An example of such an automatically-locking retractor mechanism is discussed in U.S. Pat. No. 3,604,654 to R. W. Stoffel. An automatic-locking retractor having selector means for selectively engaging and disengaging the automatic-locking mode is discussed in U.S. Pat. No. 3,771,814 to F. Hahn.

An example of a child safety seat and automatic-locking restraint means therefor is found in U.S. Pat. No. 3,912,328 to A. Tanaka.

However, many adult passengers find the degree of restraint associated with the automatic-locking mode uncomfortable and prefer a retractor mechanism which permits a relatively unrestrained movement within the vehicle during non-emergency conditions. To provide this alternative mode, it is known in the art to make retractor mechanisms acceleration-sensitive ("ELR"), i.e., means are provided within the retractor for sensing accelerative forces acting upon the vehicle and/or safety belt and for detecting acceleration levels of a predetermined value and for locking the retractor against further extractive movement of the belt upon detection thereof.

An example of vehicle inertia sensor operating in conjunction with a retractor mechanism is discussed in U.S. Pat. No. 4,018,400 to C. Henderson, and an example of a retractor having an actuator which releases a spring-biased pawl to lock the retractor reel in response to belt accelerations is disclosed in U.S. Pat. No. 3,604,655 to D. Jones.

In operation, these ELR-type of retractor mechanisms provide the advantage of a relatively unfettered degree of movement of the adult passenger within the vehicle during normal conditions, and lock up to restrain the passenger against further extractive movement of the belt only upon occurrence of the emergency condition. However, their disadvantage is that they are not suitable for restraining small children or infant seats or carriers within the vehicles during emergency or nonemergency conditions, for reasons discussed below.

It is not uncommon to find retractors capable of operating selectively in either an ALR or ELR mode, or both. R. Fisher, in U.S. Pat. No. 4,042,277, discloses a restraint system having floor and pillar mounted retractors, one of which locks electrically into the ALR mode upon buckling-up. A similar, free pull retractor which locks electromagnetically upon buckling-up is shown in U.S. Pat. No. 3,890,003 to A. Close. A manually-actuated cinch lock operating independently of associated comfort mechanisms, e.g., the ELR mode, is disclosed in U.S. Pat. No. 4,427,164 to Rumpf. In U.S. Pat. No. 4,428,545 to K. Naitoh, a manual locking mechanism is provided which is operable either electrically or mechanically. Combination ELR and ALR retractors which are converted to the ALR mode upon full extraction of the belt from the retractor are disclosed in U.S. Pat. No. 4,518,132 to T. Schmidt and U.S. Pat. No. 4,552,319 to Gavagan, et al.

In smaller vehicles, particularly compact-sized cars, it is not unusual to find a passenger restraint system in which a knee bolster is used to restrain the knees, and hence lower torso, of a passenger in a seat against forward movement during emergency conditions, which is supplemented by a chest belt having one end wound onto an acceleration-sensitive retractor attached at the lower, inward side of the seat and passing across the chest of the passenger to engage with quick-release means attached to the adjacent door or door frame, usually by means of a tongue-plate and quick-release buckle arrangement. Such restraint systems have the advantage of safely restraining adult pssengers during emergency conditions while permitting relatively unrestrained movement with the vehicle during normal operation.

However, these latter systems present a problem when used to restrain infants or small children. Typical state laws require children under a certain weight or age limit to be primarily seated within a safety seat or carrier which is, in turn, safely restrained within the vehicle's seat. For children over the limit in age or size, the law merely requires that they be adequately restrained by a safety belt arrangement. However, the knee bolster and acceleration-sensitive chest belt are inadequate for restraining either an infant seat or a small child, inasmuch as the child's leg length is typically too short for the knee bolster to function correctly and the chest belt typically will pass too high on the child to safely restrain the child's upper torso. Additionally, acceleration-sensitive retractors are undesirable for restraining small children or infant seats within the vehicle during normal operation for the reasons discussed above.

It is therefore an object of the present invention to provide a dual mode passenger restraint system for a vehicle which is capable of operating in either an acceleration-sensitive chest belt mode in conjunction with a knee bolster, or in an automatic-locking lap belt or safety-seat-restraining mode independently of the bolster.

It is a further object of the present invention to provide a kit for retrofitting a vehicle already equipped with a knee bolster and an acceleration-sensitive chest belt with such a dual mode system.

SUMMARY OF THE INVENTION

These objects are preferably accomplished, in a vehicle already equipped with a knee bolster and a chest belt having one end wound on an accelertion-sensitive retractor located at the lower, inward side of the seat and a second end passing across the chest of the passenger and engaging with first quick-release means attached to an adjacent door or door frame, by the provision within the vehicle of a replacement retractor for replacing the acceleration-sensitive retractor, the replacement retractor having both an acceleration-sensitive mode and an automatic-locking mode and control means, including remotely-located switch means, for switching the replacement retractor into the automatic-locking mode, and second quick-release means for installation at the lower, outward side of the seat for releasably-attaching the second end of the belt thereat such that the belt passes across the lap of the passenger or the infant seat, the second quick-release means including the switch means for switching the replacement retractor to the automatic-locking mode when the second end of the belt is engaged therewith.

These objects and other objects and advantages of the present invention will become evident to those skilled in the art upon a consideration of the following detailed description of the preferred embodiments thereof, particularly when read in conjunction with the appended drawings, of which the following is a brief description.

DESCRIPTION OF THE PREFERRED EMBODIMENTS

Figures 1, 2A, 2B:
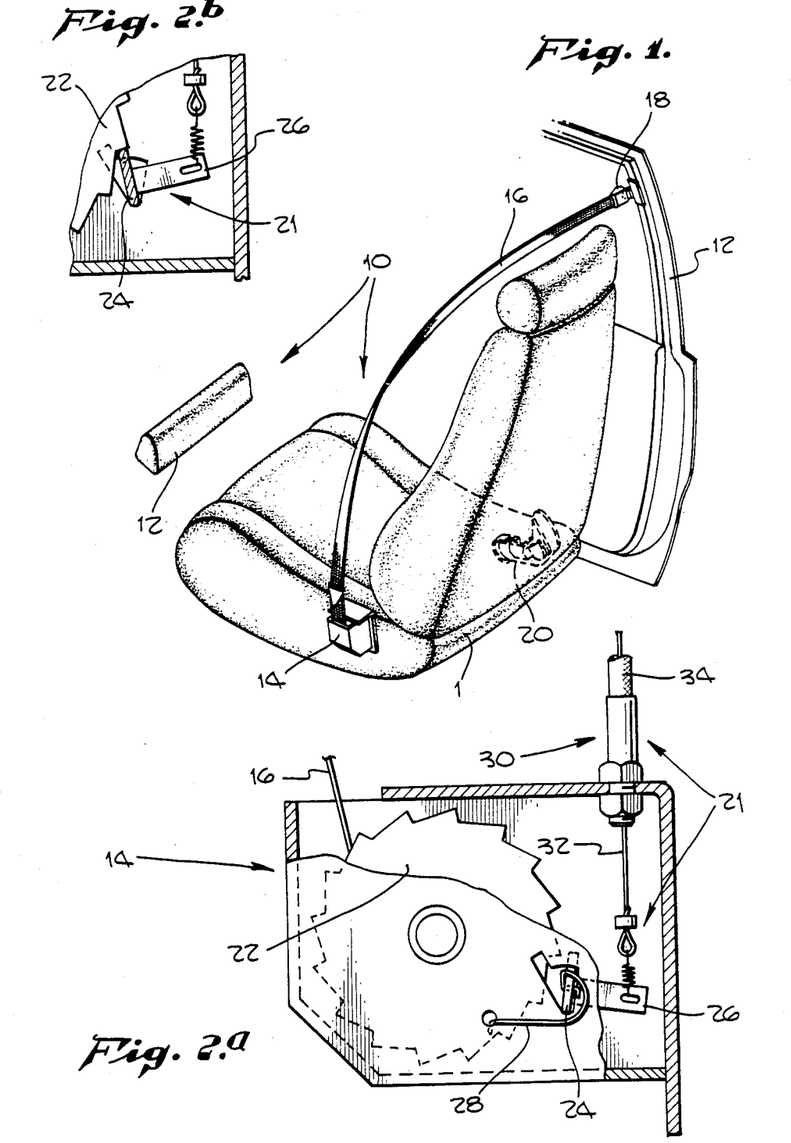
FIG. 1 is a side, rear perspective view of a dual mode passenger restraint system in a vehicle in which a safety belt is attached by first quick-release means to a door of the vehicle adjacent to a passenger seat within the vehicle to operate in a chest belt mode.
FIG. 2a is a schematic diagram of a dual mode retractor having mechanically-switchable, automatic-locking means, with the ALR mode disengaged.
FIG. 2b is a detail of the retractor of FIG. 2a with the ALR mode shown engaged.

FIG. 1 illustrates an exemplary preferred embodiment of a vehicular passenger restraint system 10 in keeping with the subject of the present invention.

Restraint system 10 operates in conjunction with a passenger seat 1 located within the vehicle and a door 2 or door frame 3 adjacent to seat 1.

The system comprises a knee bolster 12 located in front of seat 1 whose purpose it is to oppose the knees of an adult passenger within the vehicle such that, during emergency conditions, such as a collision or a sudden stop of the vehicle, the passenger's knees will abut knee bolster 12 and prevent further forward movement of the passenger's lower torso in a manner known in the art.

Figures 3, 4B:
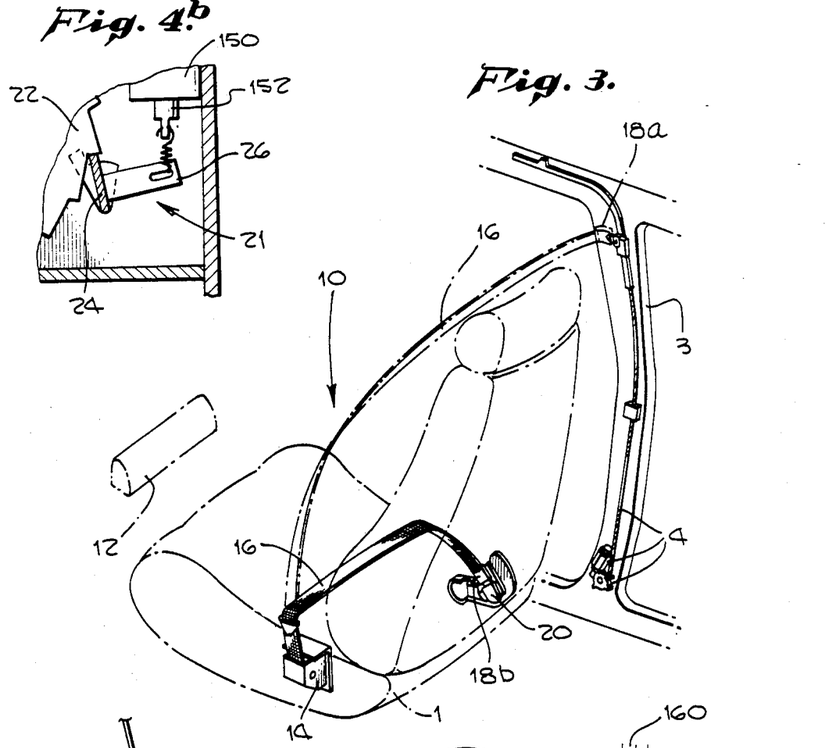
FIG. 3 is a side, rear perspective view of a dual mode passenger restraint system in which the safety belt is shown in phantom lines attached by first quick-release means to a door frame of the vehicle to operate in the chest belt mode, and in solid lines attached to second quick-release means located on the lower, outward side of the seat to operate in a lap belt or child safety seat restraining mode.
FIG. 4b is a sectional detail of the retractor of FIG. 4a, with the ALR mode shown engaged.

Operating in conjunction with knee bolster 12 is a safety belt retractor 14 which is mounted to the vehicle or seat at the lower, inward side of seat 1 such that a safety belt 16 having one end retractably wound onto retractor 14 can pass across the chest of the passenger and connect to door 2 or door frame 3 by means of first quick-release means 18 attached to door 2 or door frame 3, as illustrated in FIGS. 1 and 3, respectively. It is contemplated that the first quick-release means will comprise a tongue-plate and quick-release buckle pair, one being attached to safety belt 16 and the other to door 2 or door frame 3, as is well known in the art and illustrated in FIGS. 2 and 3. Where safety belt 16 attaches to door frame 3 (see FIG. 3), the vehicle may also include automatic positioning means 4 for positioning first quick-release means 18 automatically with forward or rearward movements of seat 1, to accommodate shorter or taller passengers.

Restraint system 10 described to this point constitutes a type of known system to be found in typical small compact or subcompact vehicles marketed today. In these systems, retractor 14 typically operates in an acceleration-sensitive mode, i.e., retractor 14 operates to sense accelerations of the vehicle or belt 16, or both, and to detect acceleration levels of a predetermined amount, such as would be encountered during typical emergency conditions, thereby causing retractor 14 to lock up against further extractive movement of belt 16, as is known in the art and described in U.S. Pat. No. 4,018,400 to Henderson and/or U.S. Pat. No. 3,604,655 to Jones.

An undesirable limitation of this prior art restraint system is its inability to accommodate children, either directly within seat 1, or secondarily within a child restraint seat or infant carrier retained in seat 1. This is because knee bolster 12 is typically situated to accommodate the leg length of an adult passenger and the child's leg length is too short to permit the child's torso to be safety retained within seat 1 by knee bolster 12 during emergency conditions. Also, safety belt 16 operates as a chest belt to restrain the upper torso of a typical adult. Accordingly, safety belt 16 will strike a short child at the neck or head, or will pass entirely over the head of the child, and is thus inadequate to restrain the upper torso of the child during emergency conditions. Finally, safety belt 16 operating in a acceleration-sensitive chest belt mode is inadequate to restrain a child's safety seat of infant carrier because such seats or carriers are typically designed to be secured to seat 1 at a lower structural point and intended to be restrained against any movement within the vehicle whatsoever during both emergency conditions and normal operating conditions.

Accordingly, it is desirable to provide a dual mode passenger restraint system which is capable of operating in either an acceleration-sensitive, chest-belt mode for restraining adults in the known manner or in a automatic locking, lap-belt mode for restraining a small child or child's safety seat.

This may be accomplished by the provision within the vehicle of a dual mode retractor 14 having both an acceleration-sensitive and an automatic-locking mode, in which the retractor 14 includes means for switching to, or the engagement of, the automatic locking mode in response to operation of remotely-located switch means 40 associated with second quick-release means 20 mounted to the vehicle or seat at the lower, outward side of seat 1, such that engagement of the second end of safety belt 16 serves to convert safety belt 16 to a lap-restraining or safety-seat-restraining configuration and to operate the switch means to switch retractor 14 to the automatic-locking mode.

Using known techniques, it is possible to postulate a number of possible configurations of such a dual mode retractor. FIGS. 5-10 are schematic state diagrams of some of the possible configurations of retractor 14.

Figure 5:
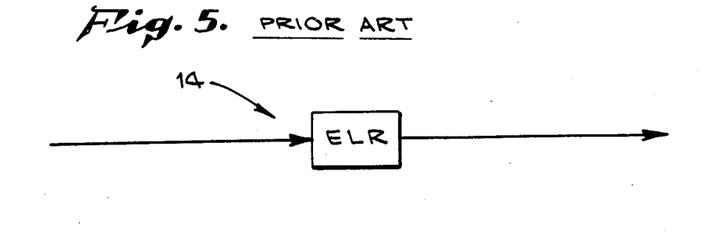
FIG. 5 is a schematic state diagram of an acceleration-sensitive retractor of the prior art.

FIG. 5 illustrates a state diagram of a retractor 14 of the prior art in which the acceleration-sensitive mode ("ELR") is always operative, such as the retractor described by Henderson in U.S. Pat. No. 4,018,400.

Figure 6:
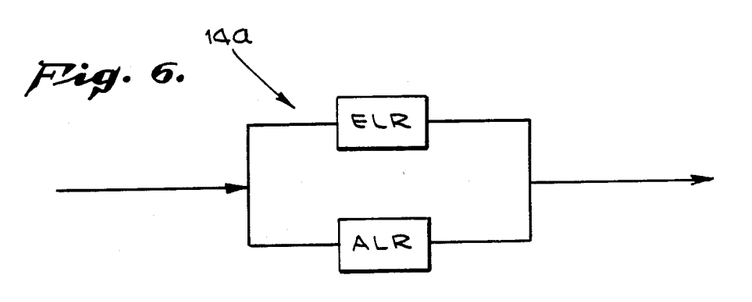
FIG. 6 is a schematic state diagram of a dual mode retractor having an acceleration-sensitive mode and an automatic-locking mode operating in parallel.

FIG. 6 illustrates a dual mode retractor 14a usable with the present invention having both acceleration-sensitive modes and an automatic-locking mode ("ALR"), which modes are both always engaged. Retractor 14a is thus representative of a very conservative approach in that retractor 14a is configured such that both modes operate simultaneously and in parallel. In the context of the present invention, second quick-release means 20 requires no switch means 36 associated therewith for safe operation in connection with either an adult or a child or child's safety seat. However, many adult passengers would find the always-engaged auto-locking mode of retractor 14a unnecessarily restrictive, in that the auto-locking mode precludes free-spooling of retractor 14a, and hence, relatively unfettered movement of the passengers within the vehicle during normal operation.

Figure 7:
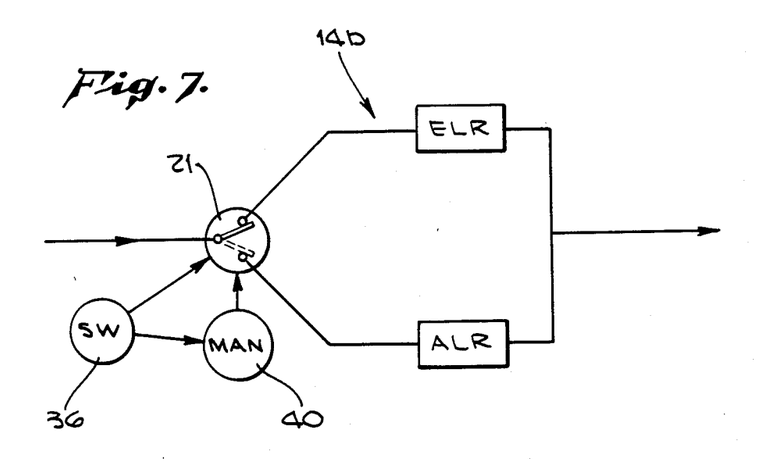
FIG. 7 is a schematic state diagram of a dual mode retractor having control means for switching between the two modes, including selector means for manually selecting between the two modes and switch means for remotely-switching the retractor to the automatic-locking mode and for overriding the selector means.

FIG. 7 is a state diagram of a retractor 14b having both acceleration-sensitive and automatic-locking modes, and control means 21 for switching between the two modes. When such a retractor 14b is utilized with the restraint system 10 of the present invention, remotely-located switch means 36 serves to switch selector 14b to the automatic-locking mode whenever the second end of safety belt 16 is engaged with second quick-release means 20. Additionally, selector 14b may be modified to include selector means 40 for manually switching between the acceleration-sensitive mode and the automaticlocking mode to permit adult passengers to select between the two modes whether belt 16 operates as a chest or lap belt. However, in such a configuration, switch means 36 must also include means for overriding selector means 40 such that retractor 14b is always switched to the automatic-locking mode whenever the second end of safety belt 16 is engaged with second quick-release means 20 in order to insure that small children or safety seats are safely restrained. Skilled practitioners will recognize that, in accordance with the embodiments of acceleration-sensitive retractors and automatic-locking retractors of the prior art, the two modes are easily implemented to operate independently of one another, since the acceleration-sensitive mode becomes operative only during emergency conditions. Accordingly, the embodiment of the dual mode retractor 14b illustrated schematically in FIG. 7 is illustrative of a conceivable, but somewhat impractical approach.

Figure 8:
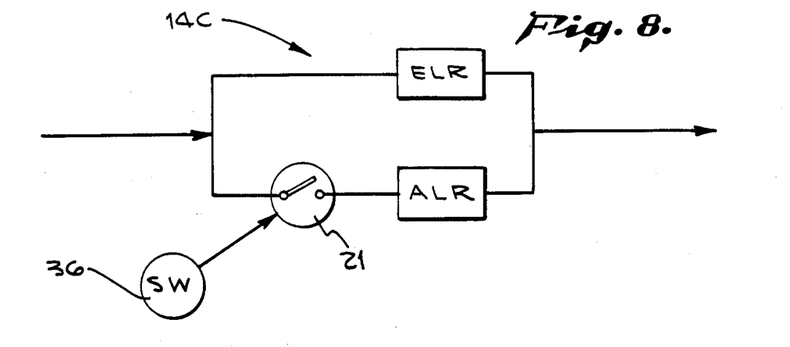
FIG. 8 is a schematic state diagram of a dual mode retractor having control means, including means for engaging an automatic-locking mode and switch means for remotely-switching the engaging means.

A more practical approach to a dual mode retractor for use in conjunction with the restraint system 10 of the present invention is the retractor 14c illustrated in the state diagram of FIG. 8. Here, retractor 14c includes engagement means 21 for engaging a normally-disengaged automatic-locking mode which are operatively-responsive to remotely-located switch means 36 associated with second quick-release means 20 for switching retractor 14c to the automatic-locking mode whenever the second end of belt 16 is engaged therewith.

Figure 9:
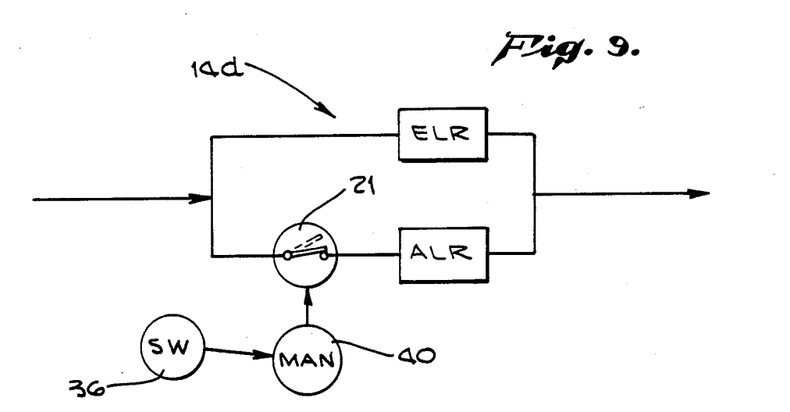
FIG. 9 is a schematic state diagram of a dual mode retractor having control means, including means for disengaging a normally-engaged automatic-locking mode, selector means for manually operating the disengaging means and switch means for remotely-overriding the selector means.
Figure 10:
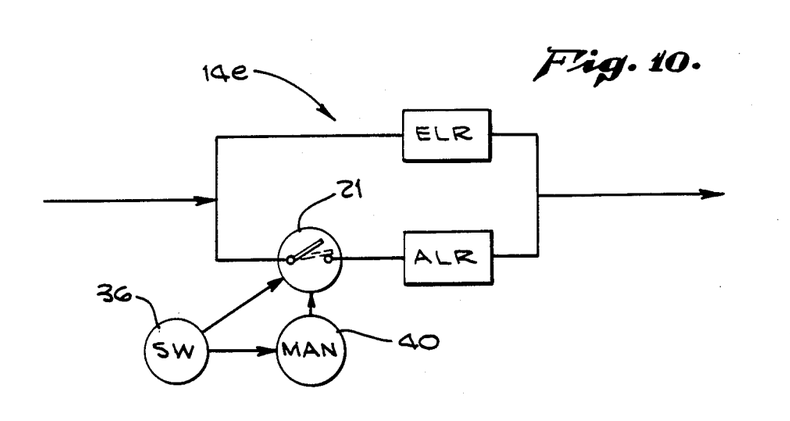
FIG. 10 is a schematic state diagram of a dual mode retractor having control means, including means for engaging a normally-disengaged automatic-locking mode, selector means for manually engaging the engaging means and switch means for remotely-switching the engaging means and for overriding the selector means.

A slightly more elaborate configuration of the retractor 14c illustrated schematically in FIG. 8 is to be found in the retractor configurations of 14d and 14e of FIGS. 9 and 10, respectively. In FIG. 9, retractor 14d is provided with automatic-locking engagement means 21 which are normally engaged, but may be selectively disengaged by operation of selector means 40 for manually disengaging the automatic-locking mode. The automatic-locking mode portion of retractor 14b might thus be configured along the lines of those set forth in the retractor of Hahn in U.S. Pat. No. 3,771,814. When such a retractor 14d is incorporated in the restraint system 10 of the present invention, remotely-located switch means 36 simply comprises override means for overriding selector means 40 such that engagement means 21 for engaging the automatic-locking mode are either reset to, or remain in, the engaged position illustrated in FIG. 9.

In FIG. 10, the retractor 14e includes engagement means 21 for engaging the automatic-locking mode which is normally in the disengaged position, but which may be selectively manually engaged in the automatic-locking mode by selector means 40. In this enbodiment, remotely located switch means 36 includes not only means for switching engagement means 21 to the engaged position but also override means for overriding selector means 40 such that the automatic-locking mode of retractor 14e cannot be disengaged while the second end of belt 16 is engaged with second quick-release means 20.

One embodiment of such a dual mode retractor is illustrated schematically in FIG. 2a, which may include elements from prior art retractors such as those in U.S. Pat. No. 4,428,545 to Naitoh or U.S. Pat. No. 4,427,164 to Rumpf. Here, retractor 14 includes a safety belt 16 having one end wound onto a spool for retractive and extractive movement thereon. In addition to an acceleration-sensitive mode (not illustrated), dual mode retractor 14 also includes control means 21 for engaging an automatic locking mode which, in the embodiment illustrated in FIG. 2, comprises a toothed rack 22 which is attached to the retractor's spool for locking engagement and non-locking disengagement with locking pawl 24. Locking pawl 24 is mounted to a locking lever 26 which is movably-mounted to the retractor's support frame for movement between the locking and unlocking positions, which are illustrated in FIGS. 2a and 2b, respectively. Biasing means, such as a spring 28, may operate to bias lever 26 into a normally-disengaged position. Control means 21 additionally includes remotely-located switch means 30 associated with second quick-release means 20 such that engagement with the second end of belt 16 serves to switch retractor 14 into the automatic-locking mode. In the exemplary embodiment illustrated schematically in FIGS. 2a and 2b, switch means 30 comprises push-wire means, including a push-wire 32 slidingly-retained within a conduit 34 and having one end attached to lever 26 for pulling lever 26 into locking engagement with rack 22.

Figure 4A:
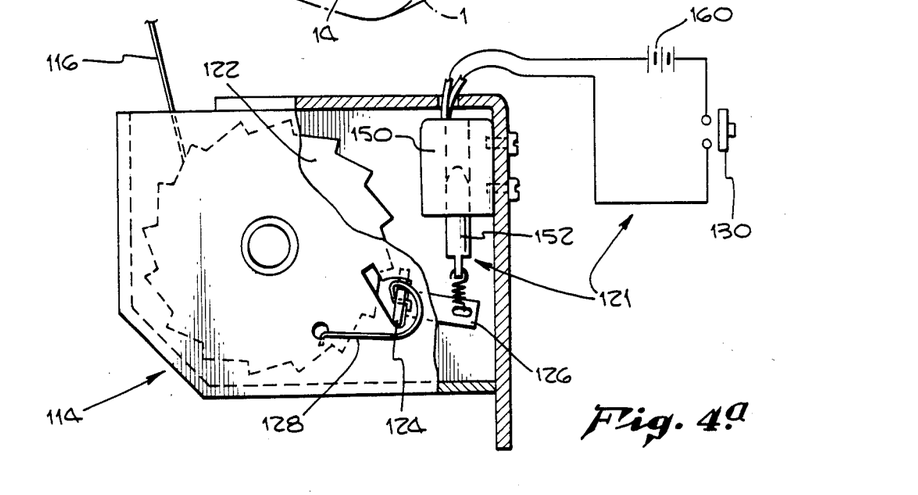
FIG. 4a is a schematic diagram of a dual mode retractor having electrically-switchable, automatic locking means, with the ALR mode shown disengaged.

A second embodiment of a dual mode retractor for use in conjunction with the restraint system 10 of the present invention is illustrated schematically in FIGS. 4a and 4b, with identical or similar elements numbered identically plus the number 100.

In the second embodiment, control means 121 for engaging the automatic-locking mode of retractor 114 include the same toothed rack 122 and locking pawl 124 as in the first embodiment, as well as the locking lever 126 movably-attached within retractor 114 for movement between locking engagement and unlocking disengagement. Again, retractor 114 may include biasing means 128 for biasing locking lever 126 toward a normally-disengaged position. The second embodiment differs substantively from the first embodiment in the implementation of that portion of control means 121 comprising the means for activating locking lever 126, including remotely-located switch means 130. In the second preferred embodiment, control means 121 comprises a solenoid circuit, including solenoid means 150 having a armature 152 connected with locking lever 126 for moving locking lever 126 to the spool-locking position. The solenoid circuit additionally includes some form of motive means 160, e.g., the vehicle's 12-volt power supply, as well as remotely-located switch means 130 so interconnected in the solenoid circuit to connect motive means 160 to solenoid means 150 when the second end of belt 16 is engaged with second quick-release means 20, in a manner already known in the seat belt art.

Although the solenoid circuit of control means 121 of the second embodiment is depicted as being electrical in nature, skilled practitioners will recognize that other control means 121 are practical in the context of the present invention. For example, solenoid means 150 may comprise a piston within a cylinder which may be actuated by means of hydraulic, pneumatic or vacuum motive means 160.

Additionally, skilled practitioners will recognize that the retractors 14 or 114 of the first or second embodiments may be provided with selector means for manually engaging or disengaging the automatic-locking mode of the retractors, as discussed above, as a convenience feature. The selector means may simply comprise an arm hinged in the middle and having a handle attached thereat with one end of the arm being attached to lever 26 and the other end pivotally-attached to the retractor's support frame such that movement of the handle causes the arm to "toggle" over-center between two bi-stable positions corresponding with the spool-locked and spool-unlocked positions of retractor 14, respectively. However, it must be borne in mind that, regardless of whether dual mode retractor 14 is provided with an automatic-locking mode with a normally-engaged or normally-disengaged state, if a manual selector means is included with the retractor, control means 21 must include means for always engaging the automatic-locking mode, if necessary, and for overriding operation of selector means whenever the second end of safety belt 16 is engaged with second quick-release means, to insure that small children or safety seats are safely retained in the vehicle at all times.

It is recognized that the restraint system of the present invention may result in an increase in the degree of complexity over that of a simple knee bolster and acceleration-sensitive chest belt system of the prior art. However, the ability of the present system to accommodate small children or safety seats may, in many instances, justify the slight addition in complexity and cost entailed to the original equipment manufacturer from the standpoint of many consumers. Moreover, the system lends itself well to its provision as a kit for retrofitting an existing vehicle equipped with a single mode system to a dual mode capability by the simple provision of a replacement retractor adapted for replacing the existing acceleration-sensitive retractor and second quick-release means for installation to the seat or vehicle at a point on the lower, outward side of the seat, the kit being easily installable at the dealer level as an extra-cost option.

The foregoing discussion and illustrations are meant to be exemplary in nature. Thus, skilled practitioners will recognize that other modifications of the elements, materials and methods of construction and operation are possible, and may be desirable, depending upon the application at hand. Accordingly, the scope and spirit of the instant application should be limited only by the claims appended hereto.

I claim:

1. In a vehicle equipped with a passenger restraint system of the type having a knee bolster in front of a seat for restraining the lower torso of the passenger in the seat during an emergency condition and a dual mode safety-belt retractor mounted at the lower, inward side of the seat, the retractor having a safety belt with one end wound thereon for extractive and retractive movement, an acceleration-sensitive mode in which the retractor detects acceleration of the vehicle or the belt, or both, of a predetermined level and locks the belt against further extractive movement, the second end of the belt passing across the chest of the passenger and engageable with first-release means attached to an adjacent door or door frame for restraining the upper torso of the passenger during emergency conditions, a kit for converting said system to a dual mode operation capable of operating as an automatically-locking lap belt for restraining children or an infant seat, comprising:

second quick-release means for mounting at the lower, outward side of said seat for alternatively releasably attaching said second end of said belt thereat when it is released from said first-release means such that said belt passes across the lap of said passenger of aid infant seat to restrain said passenger or said seat during said emergency conditions.

2. In a vehicle equipped with a passenger restraint system of the type having a knee bolster in front of a seat for restraining the lower torso of the passenger in the seat during emergency conditions and a chest belt having one end wound on an acceleration-sensitive retractor located at the lower, inward side of the seat and a second end passing across the chest of the passenger and engaging with a first quick-release means attached to an adjacent door or door frame for restraining the upper torso of the passenger during emergency conditions, a conversion kit for retrofitting said system to a dual mode operation capable of operating as an automatically-locking lap belt for restraining children or an infant seat, comprising:

a replacement retractor adapted for replacing said acceleration-sensitive retractor, said replacement retractor including:

a safety belt having one end wound thereon for extractive and retractive movement;

an acceleration-sensitive mode in which said retractor detects acceleration of said vehicle or said belt, or both, of a predetermined level and locks said belt against further extractive movement in response thereto; and an automatic-locking mode in which said retractor operates to detect consecutive extractive and retractive movements of said belt of a predetermined amount to lock said belt against further extractive movement in response thereto, said automatic-locking mode being switchable between an operative state and an inoperative state; and second quick-release means mounted at a lower, outward side of said seat for alternatively releasably attaching said second end of said belt thereat when it is released from said first quick-release means such that said belt passes across the lap of said passenger or said infant seat, said second quick-release means further incuding switch means for switching said automatic-locking mode to said operative state when said second end of said belt is engaged therewith.

3. The kit of claim 2, wherein:
said replacement retractor further includes selector means for manually-switching said retractor between said operative and inoperative states; or
said second quick-release means further includes override means for overriding said selector means when said second end of said belt is engaged therewith.

4. A dual mode passenger restraint system for a seat in a vehicle, comprising:
a knee bolster in front of said seat for restraining said passenger's lower torso during emergency conditions;

a dual mode safety-belt retractor mounted at the lower, inward side of said seat, said retractor including:

a safety belt having one end wound thereon for extractive and retractive movement;

an acceleration-sensitive mode in which said retractor detects accelerative movement of said vehicle or said belt, or both, of a predetermined level and locks said belt against further extractive movement; and an automatic-locking mode in which said retractor detects consecutive extractive and retractive movements of said belt of a predetermined amount and locks said belt against further extractive movement;

first quick-release means mounted to a door frame of said vehicle adjacent to said seat for releasably-attaching a second end of said belt to said door or door frame such that said belt passes across the chest of said passenger to restrain said passenger's upper torso during said emergency conditions; and second quick-release means mounted at a lower, outward side of said seat for alternatively releasably-attaching said second end of said belt thereat when it is released from said first quick-release means such that said belt passes across the lap of said passenger or an infant seat to restrain said passenger or infant seat during said emergency conditions.

5. The system of claim 4, wherein:
said retractor further includes selector means for selectively-switching said retractor manually between said acceleration-sensitive mode or said automatic locking mode; and
said second quick-release means further includes switch-and-override means for switching said retractor to said automatic-locking mode and for overriding said selector means when said second end of said belt is engaged therewith.

6. The system of claim 4, wherein:
said retractor's automatic locking mode is switchable from a normally-inoperative state to an operative state; and
said second quick-release means further includes switch means for switching said automatic-locking mode to said operative state when said second end of said belt is engaged therewith.

7. The system of claim 4, wherein:
said retractor's automatic-locking mode is switchable between an operative state and an inoperative state;
said retractor further includes selector means for manually switching said retractor between said operative and inoperative states; or
said second quick-release means further includes switch-and-override means for switching said retractor's automatic-locking mode to said operative state and for overriding said selector means when said second end of said belt is engaged therewith.

8. The system of claim 6, wherein said retractor further comprises:
a frame provided at a lower, inward side of said seat;
a spool rotatably-journalled in said frame, said safety-belt being wound thereon for extractive and retractive movement;
means for biasing said spool in a belt-retractive direction;
a rack attached to said spool;

a locking pawl moveable between positions of engagement and disengagement with said rack for locking and unlocking said spool against and for extractive movement; and automatic-locking control means for moving said pawl into said position of locking engagement with said rack in response to operation of said switch or said switch-and-override means.

9. The system of claim 8, wherein said automatic-locking means further comprises:

a lever attached to said pawl and movably-retained on said frame for movement between said spool-locking and spool-unlocking positions;

biasing means for urging said lever towards said spool-unlocking position; and push-wire means, including a wire-slidably-retained in said vehicle, said wire having one end attached to said lever and a second end associated with said second quick-release means such that engagement of said second end of said belt with said second quick-release means exerts a pulling force on said second end of said wire which is transmitted through said wire to said lever to urge said lever against said biasing means and into said spool-locking position.

10. The system of claim 8, wherein said automatic-locking control means further comprises:

a lever attached to said pawl and movably-retained on said frame for movement between spool-locking and spool-unlocking positions;

biasing means for urging said lever towards said spool-unlocking position; and a solenoid circuit including:

solenoid means attached to said frame, said solenoid means having an armature connected to said lever for moving said lever to said spool-locking position when said solenoid means is energized;

motive means for energizing said solenoid circuit; and wherein said switch means is connected to said solenoid circuit such that engagement of said second end of said belt with said second-release means operates said switch means to connect said motive means into said circuit for energizing said solenoid means to urge said lever against said biasing means and into said spool-locking position.

* * * * *